US012497272B2

(12) United States Patent
Bacon et al.

(10) Patent No.: US 12,497,272 B2
(45) Date of Patent: Dec. 16, 2025

(54) LIFT ASSEMBLY

(71) Applicant: Herkules Equipment Corporation, Walled Lake, MI (US)

(72) Inventors: Todd John Bacon, Northville, MI (US); Eliana Virginia Podolski Bacon, Northville, MI (US); Scott Francis Wilhelm, Brighton, MI (US); Leigh Nelson Gaither, Taylor, MI (US)

(73) Assignee: Herkules Equipment Corporation, Walled Lake, MI (US)

( * ) Notice: Subject to any disclaimer, the term of this patent is extended or adjusted under 35 U.S.C. 154(b) by 363 days.

(21) Appl. No.: 18/204,290

(22) Filed: May 31, 2023

(65) Prior Publication Data
US 2023/0382698 A1 Nov. 30, 2023

Related U.S. Application Data

(60) Provisional application No. 63/347,333, filed on May 31, 2022, provisional application No. 63/347,311, filed on May 31, 2022.

(51) Int. Cl.
*B66F 7/00* (2006.01)
*B66F 7/06* (2006.01)
(Continued)

(52) U.S. Cl.
CPC ............... *B66F 7/065* (2013.01); *B66F 7/28* (2013.01); *F16H 1/22* (2013.01); *F16H 7/02* (2013.01);
(Continued)

(58) Field of Classification Search
CPC .......... B66F 7/00; B66F 7/065; B66F 7/0658; B66F 7/0666; B66F 7/0691
See application file for complete search history.

(56) References Cited

U.S. PATENT DOCUMENTS

| 907,176 | A | 12/1908 | Richardson |
| 1,882,069 | A | 10/1932 | Ekstromer |

(Continued)

FOREIGN PATENT DOCUMENTS

| CN | 211169687 U | 8/2020 |
| EP | 1375410 A1 | 1/2004 |

(Continued)

OTHER PUBLICATIONS

English language abstract for JPH 09-46969 A extracted from espacenet.com database on Aug. 14, 2024, 1 page.

(Continued)

*Primary Examiner* — Lee D Wilson
(74) *Attorney, Agent, or Firm* — Howard & Howard Attorneys PLLC

(57) ABSTRACT

A lift assembly includes a base, a platform coupled to the base and moveable between a lowered state and an elevated state, a first pair of scissor arms including a first arm and a second arm pivotably connected to one another, and a second pair of scissor arms including a third arm and a fourth arm pivotably connected to one another. The lift assembly also includes a carriage coupled to the first pair of scissor arms and to the second pair of scissor arms. The carriage includes a shaft extending transverse to the first arm, the second arm, the third arm, and the fourth arm, and a centering wheel rotatably coupled to the shaft. The first arm includes a cam surface engageable with the centering wheel to guide travel of the platform between the lowered state and the elevated state.

20 Claims, 8 Drawing Sheets

(51) Int. Cl.

| | |
|---|---|
| *B66F 7/28* | (2006.01) |
| *F16H 1/22* | (2006.01) |
| *F16H 7/02* | (2006.01) |
| *F16H 7/06* | (2006.01) |
| *F16H 7/12* | (2006.01) |
| *F16H 19/06* | (2006.01) |
| *H02K 7/10* | (2006.01) |
| *H02K 7/116* | (2006.01) |
| *H02P 5/685* | (2006.01) |
| *H02P 5/695* | (2006.01) |
| *F16H 7/08* | (2006.01) |

(52) U.S. Cl.
CPC .............. *F16H 7/06* (2013.01); *F16H 7/1263* (2013.01); *F16H 19/06* (2013.01); *H02K 7/1004* (2013.01); *H02K 7/116* (2013.01); *H02P 5/685* (2013.01); *H02P 5/695* (2013.01); *F16H 2007/0806* (2013.01); *F16H 2007/0865* (2013.01); *F16H 2007/0891* (2013.01); *F16H 2007/0895* (2013.01); *F16H 2019/0668* (2013.01)

(56) References Cited

U.S. PATENT DOCUMENTS

| | | | |
|---|---|---|---|
| 2,463,349 A | 3/1949 | Baner | |
| 3,168,665 A | 2/1965 | Holper | |
| 4,024,972 A | 5/1977 | Hobson | |
| 4,457,403 A * | 7/1984 | Ream | B66F 11/042 |
| | | | 187/244 |
| 8,662,477 B2 | 3/2014 | Bacon | |
| 8,708,089 B2 | 4/2014 | Kitahata et al. | |
| 8,714,524 B2 | 5/2014 | Bacon | |
| 8,733,508 B2 | 5/2014 | Bacon | |
| 9,422,142 B2 | 8/2016 | Bacon et al. | |
| 11,655,100 B2 | 5/2023 | Scarth | |
| 12,358,767 B2 * | 7/2025 | Bacon | H02P 5/695 |
| 2010/0012909 A1 * | 1/2010 | Lee | B66F 7/085 |
| | | | 254/93 R |
| 2014/0103277 A1 * | 4/2014 | Cormack | B66F 7/065 |
| | | | 254/89 R |
| 2023/0286793 A1 * | 9/2023 | Bafile | B66F 7/0666 |
| 2023/0382698 A1 * | 11/2023 | Bacon | H02K 7/1004 |
| 2024/0084878 A1 * | 3/2024 | Bacon | B66F 7/28 |
| 2025/0223141 A1 * | 7/2025 | Dahlberg | B66F 7/08 |

FOREIGN PATENT DOCUMENTS

| | | |
|---|---|---|
| GB | 764005 A | 12/1956 |
| JP | H0946969 A | 2/1997 |

OTHER PUBLICATIONS

U.S. Appl. No. 18/204,268, filed May 31, 2023.
U.S. Appl. No. 18/204,280, filed May 31, 2023.
U.S. Appl. No. 63/347,311, filed May 31, 2022.
International Search Report for Application No. PCT/US2025/020251 dated Jul. 15, 2025, 2 pages.
English language abstract for CN 211169687 U extracted from espacenet.com database on Jul. 22, 2025, 1 page.
English language abstract for EP 1 375 410 A1 extracted from espacenet.com database on Jul. 22, 2025, 1 page.

* cited by examiner

LIFT ASSEMBLY

CROSS-REFERENCE TO RELATED APPLICATIONS

The subject patent application claims priority to and all the benefits of U.S. Provisional Patent Application No. 63/347,311, which was filed on May 31, 2022, and claims priority to and all the benefits of U.S. Provisional Patent Application No. 63/347,333, which was filed on May 31, 2022, which are herein incorporated by reference in their entirety.

BACKGROUND OF THE INVENTION

1. Field of the Invention

The invention generally relates to a lift assembly.

2. Description of the Related Art

Lift assemblies commonly include a base, a platform moveable relative to the base, a first pair of scissor arms, and a second pair of scissor arms. The first pair of scissor arms and the second pair of scissor arms typically pivot to permit the platform to move. However, the first and second pairs of scissor arms typically require guidance as they move the platform, particularly when weight is applied to the platform. Otherwise, the first and second pairs of scissor arms are prone to misalignment which prevents the first and second pairs of scissor arms from pivoting in a manner that permits safe movement of the platform.

As such, there remains a need to provide an improved lift assembly that maintains alignment.

SUMMARY OF THE INVENTION AND ADVANTAGES

A lift assembly includes a base and a platform coupled to the base. The platform is moveable between a lowered state where the platform is proximal to the base and an elevated state where the platform is distal to the base. The lift assembly also includes a first pair of scissor arms and a second pair of scissor arms. The first pair of scissor arms includes a first arm coupled to the platform and the base, and a second arm coupled to the platform and the base. The first arm and the second arm are pivotably connected to one another. The second pair of scissor arms includes a third arm coupled to the platform and the base, and a fourth arm coupled to the platform and the base. The third arm and the fourth arm are pivotably connected to one another.

The lift assembly further includes a carriage coupled to the first pair of scissor arms to the second pair of scissor arms. The carriage includes a shaft extending transverse to the first arm, the second arm, the third arm, and the fourth arm. The carriage also includes a centering wheel rotatably coupled to the shaft. The first arm includes a cam surface engageable with the centering wheel to guide travel of the platform between the lowered state and the elevated state.

There has thus been outlined, rather broadly, certain features of embodiments of the invention in order that the detailed descriptions thereof may be better understood, and in order that the present contribution to the art may be better appreciated. Additional or alternative features of embodiments of the invention are described in further detail below.

In this respect, before explaining embodiments of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

To accomplish the above and related objects, the invention may be embodied in the forms illustrated in the accompanying drawings, attention being called to the fact, however, that the drawings are illustrative only, and that changes may be made in the specific constructions illustrated. Moreover, it is to be noted that the accompanying drawings are not necessarily drawn to scale or to the same scale. In particular, the scale of some of the elements of the drawings may be exaggerated to emphasize characteristics of the elements.

BRIEF DESCRIPTION OF THE DRAWINGS

Other advantages of the present invention will be readily appreciated, as the same becomes better understood by reference to the following detailed description when considered in connection with the accompanying drawings.

DETAILED DESCRIPTION OF THE INVENTION

Figure 1:
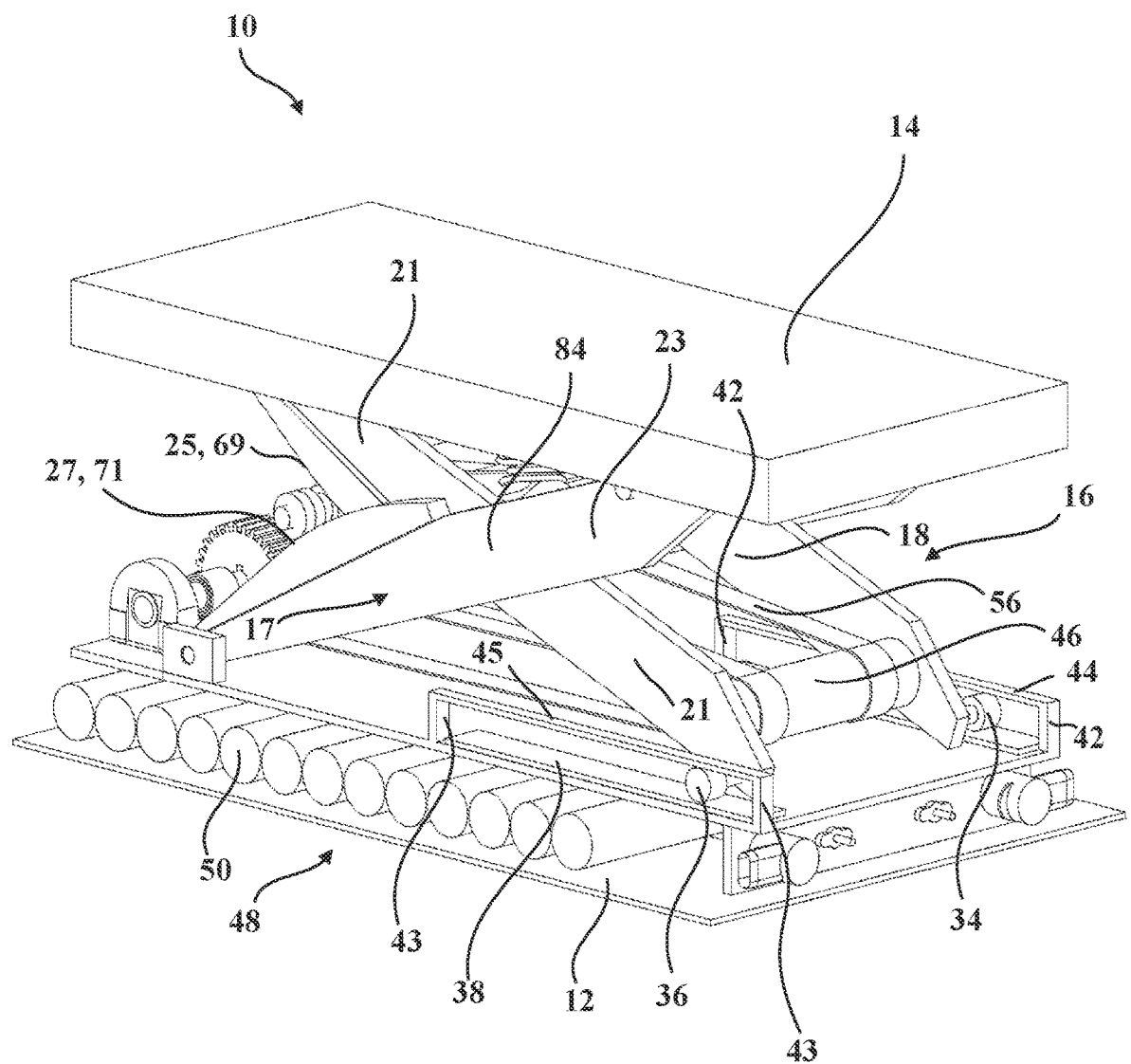
FIG. 1 is a perspective view of a lift assembly in a lowered state.
Figure 2:
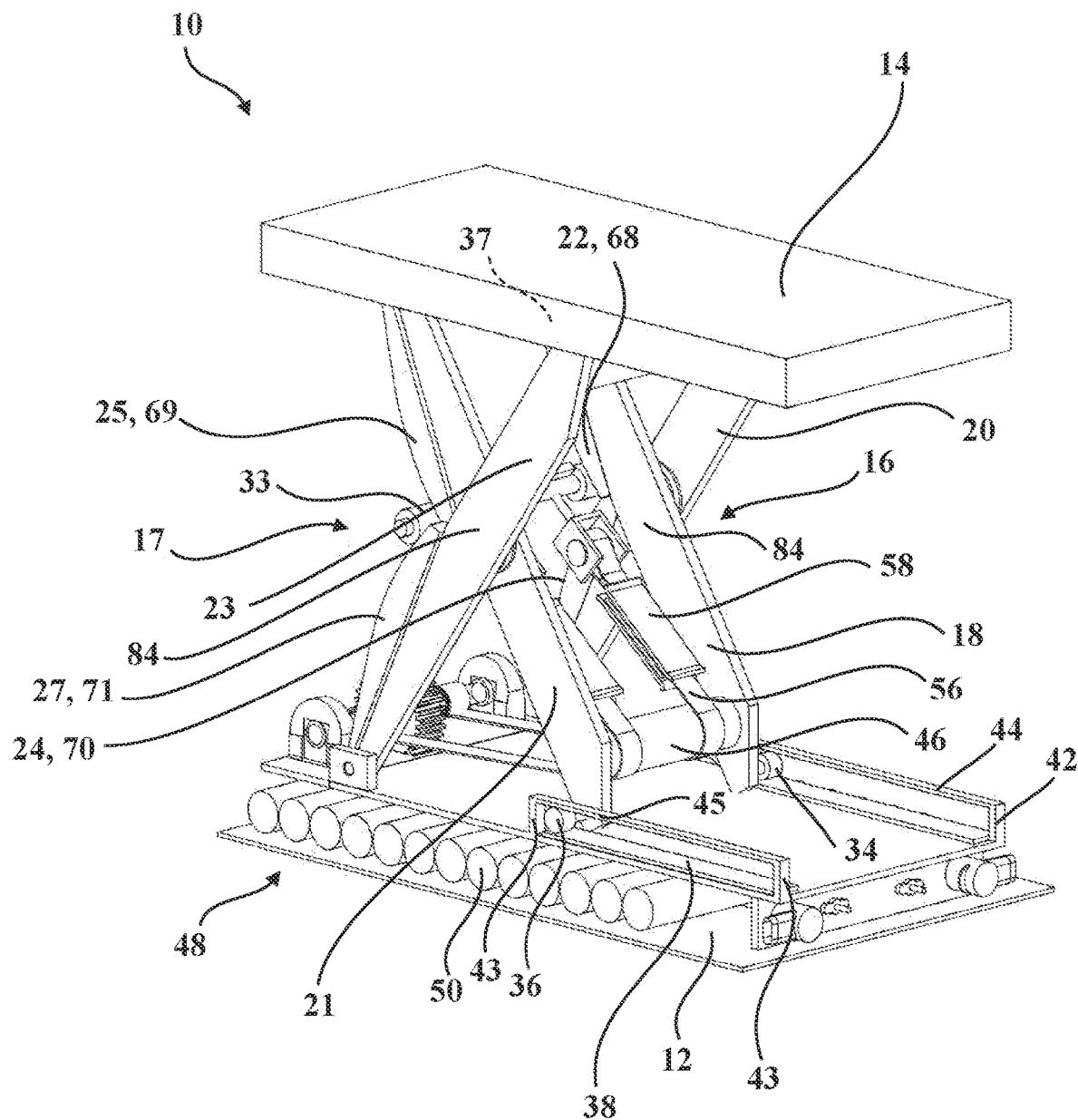
FIG. 2 is a perspective view of the lift assembly in an elevated state.

With reference to the Figures, wherein like numerals indicate like parts throughout the several views, an embodiment of a lift assembly 10 is shown in FIGS. 1-4. The lift assembly 10 includes a base 12 and a platform 14 coupled to the base 12. The platform 14 is moveable between a lowered state where the platform 14 is proximal to the base 12, as shown in FIG. 1, and an elevated state where the platform 14 is distal to the base 12, as shown in FIG. 2. The lift assembly 10 also includes a first pair of scissor arms 16 and a second pair of scissor arms 17. The first pair of scissor arms 16 includes a first arm 18 coupled to the platform 14 and the base 12, and a second arm 20 coupled to the platform 14 and the base 12. The first arm 18 and the second arm 20 are pivotably connected to one another. The second pair of scissor arms 17 includes a third arm 21 coupled to the platform 14 and the base 12, and a fourth arm 23 coupled to the platform 14 and the base 12. The third arm 21 and the fourth arm 23 are pivotably connected to one another. The lift assembly 10 further includes a carriage 82 coupled to the first pair of scissor arms 16 to the second pair of scissor arms 17. The carriage 82 includes a shaft 28 extending transverse to the first arm 18, the second arm 20, the third arm 21, and the fourth arm 23. The carriage 82 also includes a centering wheel 72 rotatably coupled to the shaft 28. The first arm 18 includes a cam surface 68 engageable with the centering wheel 72 to guide travel of the platform 14 between the lowered state and the elevated state.

Figure 4:
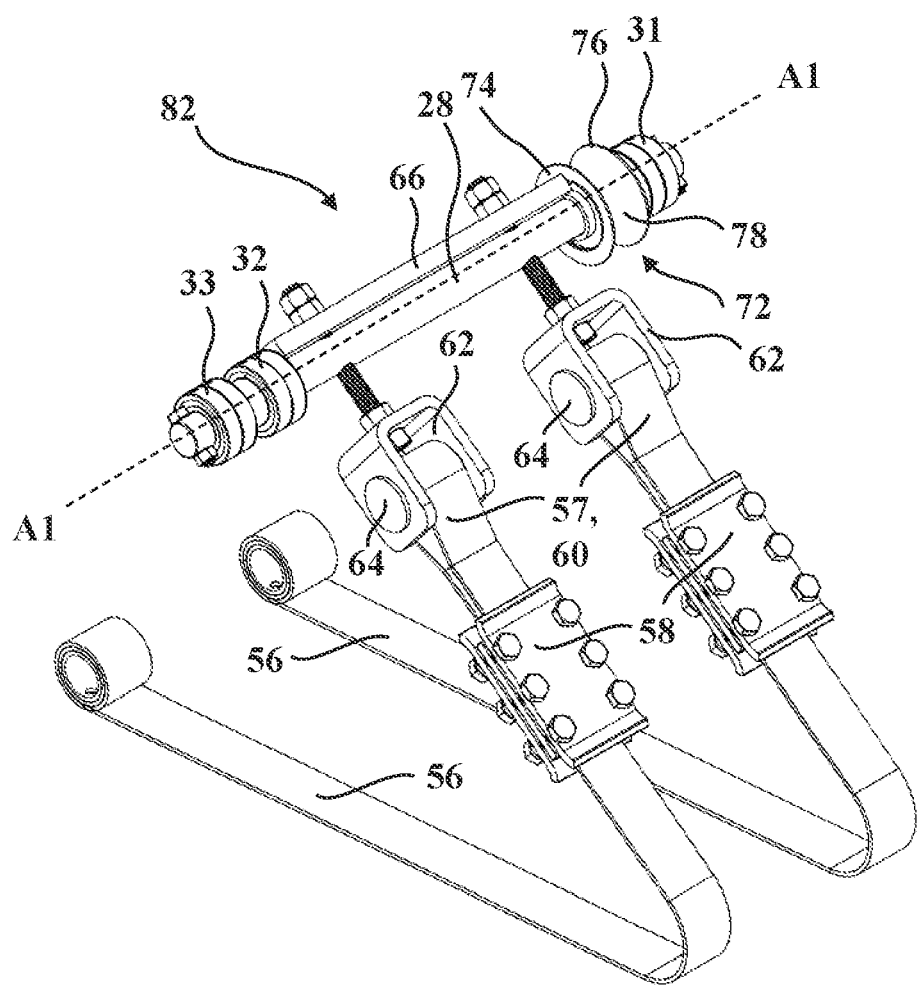
FIG. 4 is a perspective view of one embodiment of a carriage and a belt.
Figure 5:
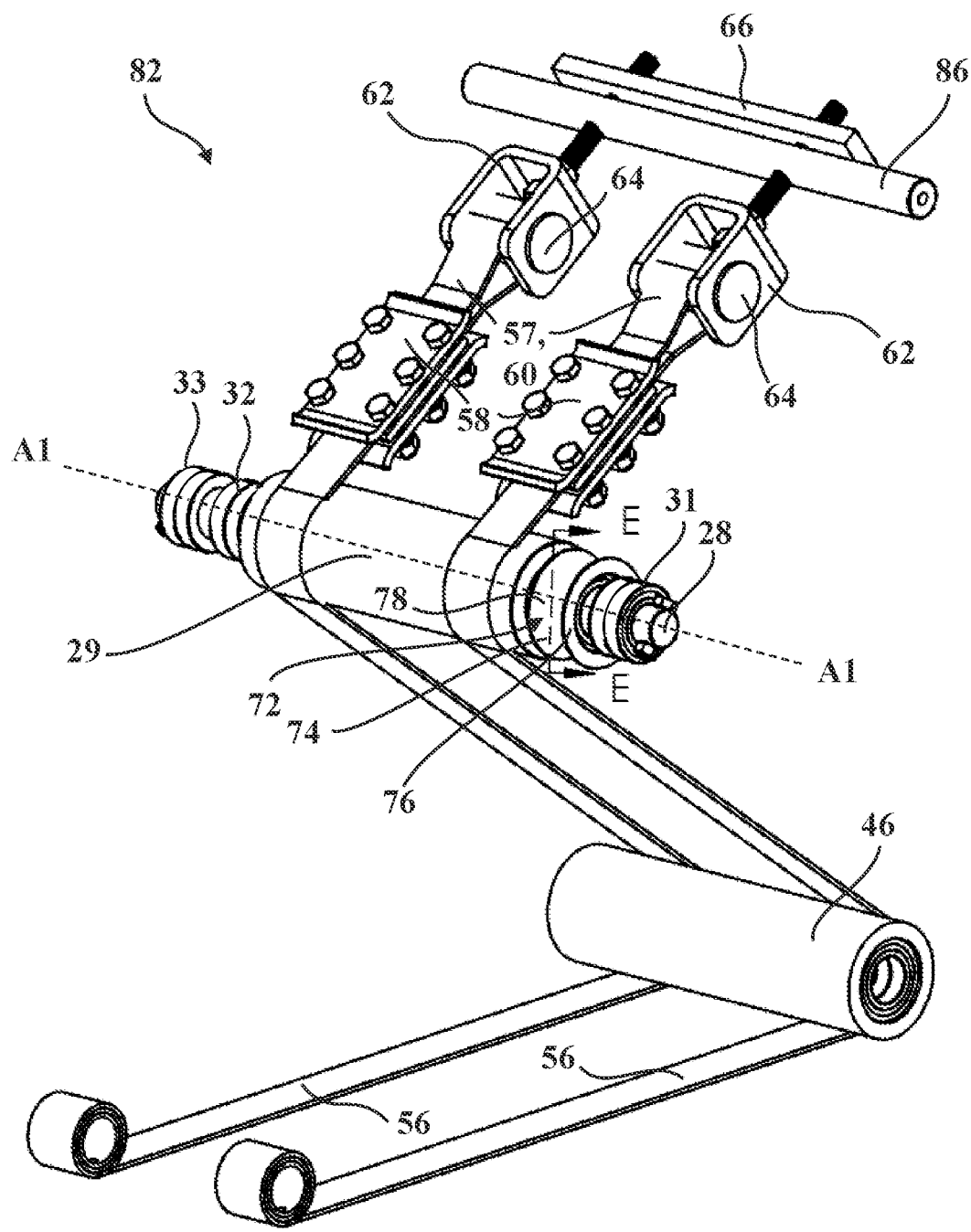
FIG. 5 is a perspective view of another embodiment of a carriage and a belt.
Figure 6:
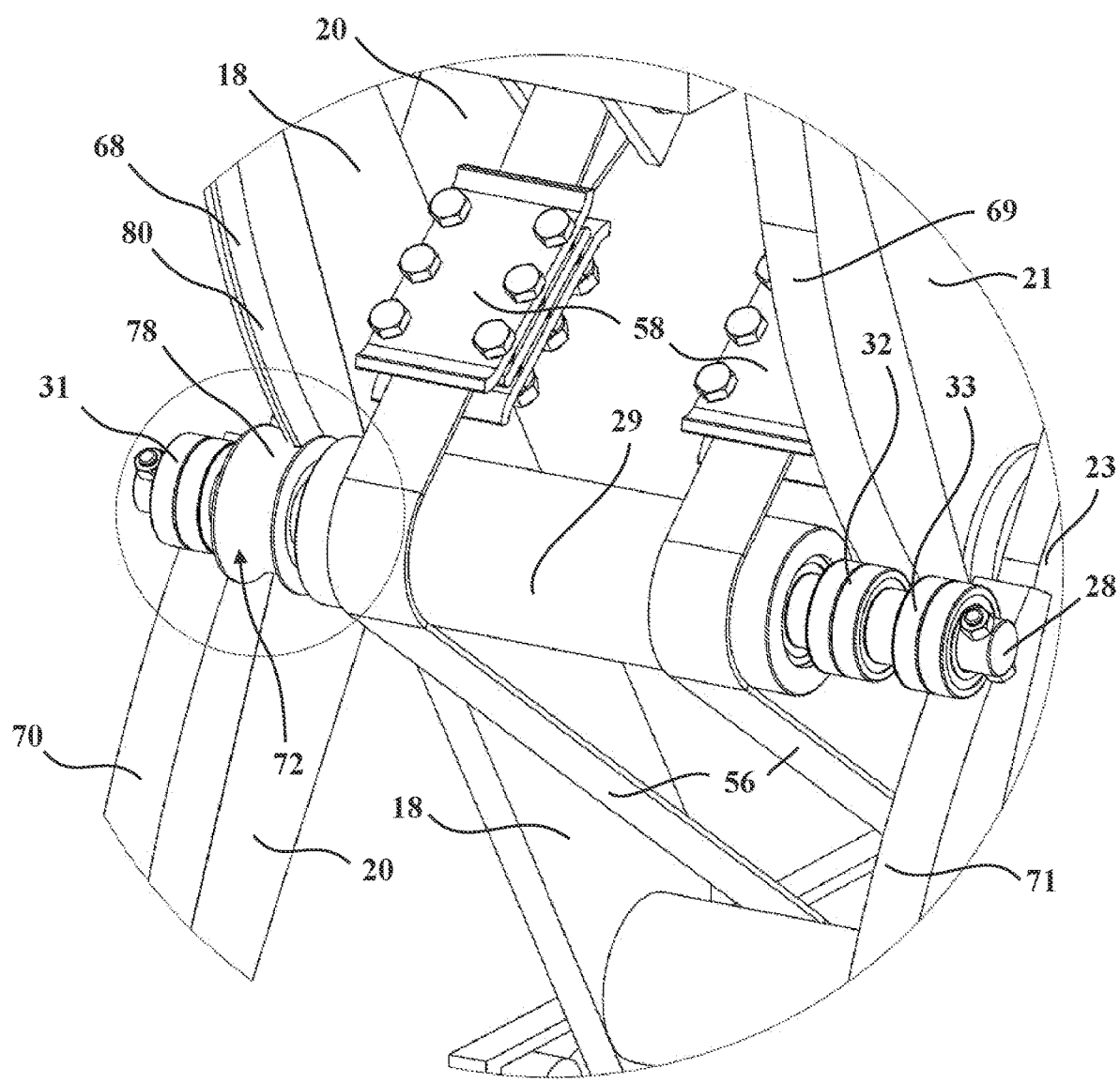
FIG. 6 is a fragmented view of the carriage of FIG. 5 with a centering wheel.
Figure 7:
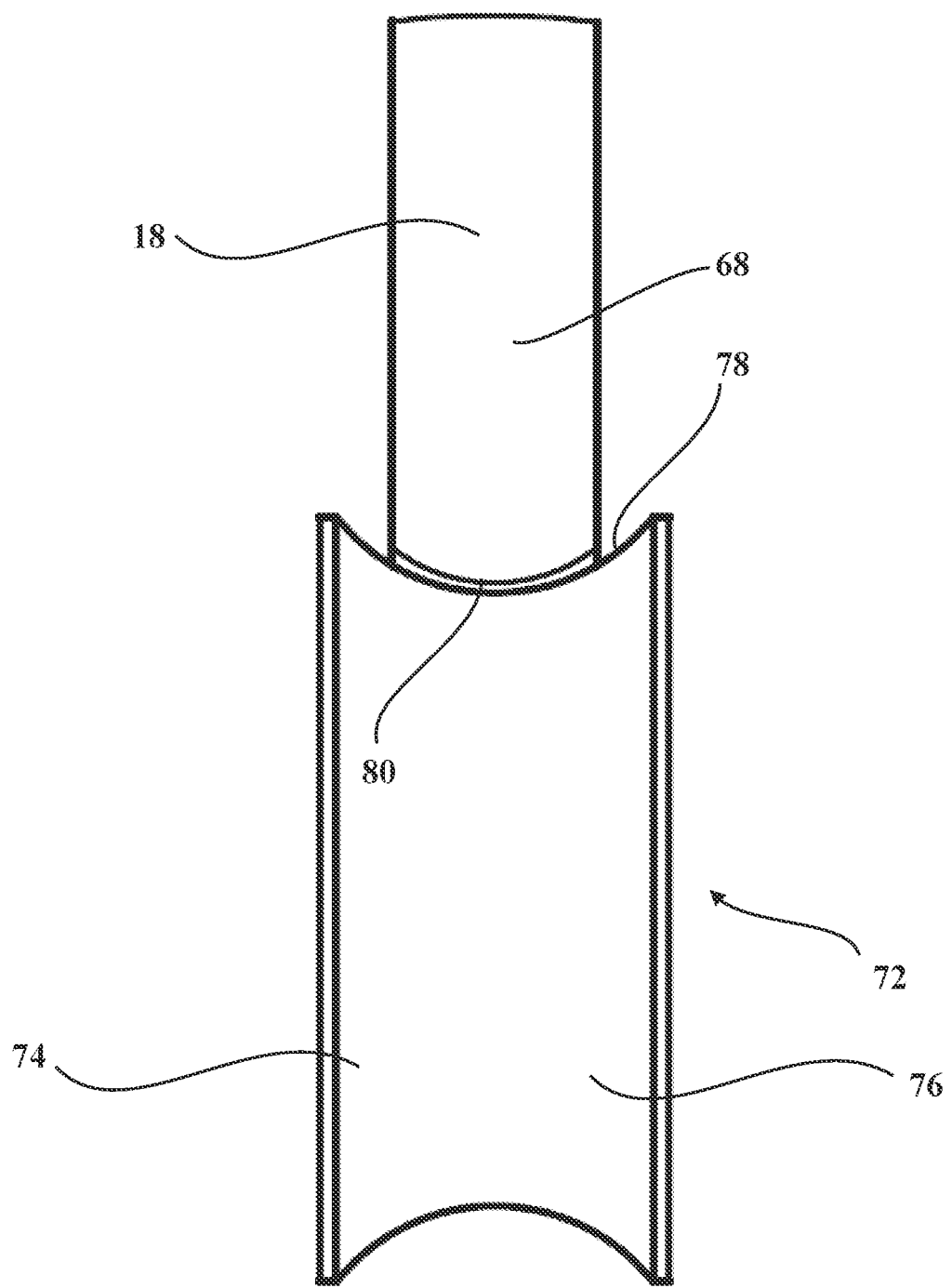
FIG. 7 is an enlarged frontal view of the centering wheel.
Figure 8:
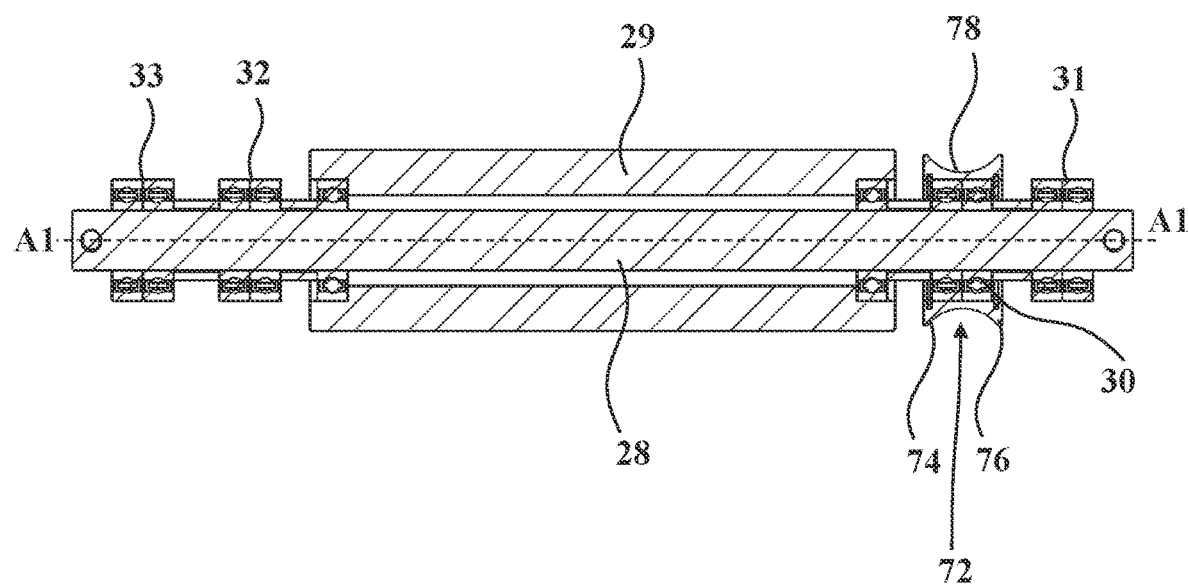
FIG. 8 is a cross-sectional view of the carriage of FIG. 5 having the centering wheel.

An alternative embodiment of the invention is shown in FIGS. 5-6 and 8 and is discussed in greater detail below. Certain aspects of the two embodiments are the same, such as the centering wheel 72 and its engagement with the cam surface 68. The shaft 28, bearings, centering wheel, and cam surfaces shown in FIGS. 6 and 8 are common to both embodiments. The roller 29, discussed below, is not present in the embodiment of FIGS. 1-4.

Referring to FIGS. 4 and 6-8, engagement between the centering wheel 72 and the cam surface 68 guides travel of the platform 14 between the lowered state and the elevated state, thus limiting misalignment of the first and second pairs of scissor arms 16, 17. Limiting misalignment of the first and second pairs of scissor arms 16, 17 also limits manual realignment of the first and second pairs of scissor arms 16, 17, saving time and limiting risk of injury to an operator.

Although not required, the centering wheel 72 may have a concave surface 78 engageable with the cam surface 68. The cam surface 68 may have a convex surface 80 shaped to correspond to the concave surface 78 of the centering wheel 72. The centering wheel 72 may have two opposing cones 74, 76 having a contoured surface 78 tapered inwardly. The first cam surface 68 may be forced by the taper of the contoured surface 78 toward the center of the centering wheel 72, which prevents the first cam surface from moving out of contact with the centering wheel 72. Moreover, the center of the centering wheel 72 may be positioned such that the first arm 18 follows an optimal path for efficiency, wear, noise, and/or stability when the platform 14 is moved between the elevated state and the lowered state. Therefore, the first arm 18 is prevented from being misaligned, which would require an operator to manually realign to continue operation of the lift assembly 10.

As perhaps best shown in FIG. 8, the lift assembly 10 may also include a bearing 30 disposed about the shaft 28. The centering wheel 72 is disposed about the bearing 30. The bearing 30 permits the centering wheel 72 to be rotatable relative to the shaft 28. More specifically, in a non-limiting example, the bearing 30 may include an inner race fixed to the shaft 28, an outer race fixed to the centering wheel 72, and a rolling element disposed between the inner race and the outer race which permits the outer race, and thus the centering wheel 72, to rotate relative to the inner race and the shaft 28. Moreover, the bearing 30 may be further defined as a first bearing 30, and the lift assembly 10 may further include another bearing 32 disposed about the shaft 28. The cam surface 68 may be further defined as a first cam surface 68, and the third arm 21 may include a third cam surface 69. The another bearing 32 is engageable with the third cam surface 69 in unison with the centering wheel 72 engaging the first cam surface 68 as perhaps best shown in FIG. 6. It is to be appreciated that the roller 29 would be removed from FIGS. 6 and 8 when used in the embodiment of FIGS. 1-4.

Moreover, the lift assembly 10 may further include a second bearing 31 disposed about the shaft 28, a third bearing 32 disposed about the shaft 28, and a fourth bearing 33 disposed about the shaft 28. The another bearing 32 may be the third bearing 32. The cam surface 68 may be further defined as a first cam surface 68, the second arm 20 may include a second cam surface 70 engageable with the second bearing 31, the third arm 21 may include a third cam surface 69 engageable with the third bearing 32, and the fourth arm 23 may include a fourth cam surface 71 engageable with the fourth bearing 33. The first arm 18 may press on the centering wheel 72 downward toward the base 12, and the third arm 21 may press on the third bearing 32 downward toward the base 12. The second arm 20 may press upward on the second bearing 31 toward the platform 14, and the fourth arm 23 may press upward on the fourth bearing 33 toward the platform 14.

The first arm 18, the second arm 20, the third arm 21, and the fourth arm 23 each have a length. The first cam surface 68, the second cam surface 70, the third cam surface 69, and the fourth cam surface 71 are arcuate along at least a portion of the lengths of the first arm 18, the second arm 20, the third arm 21, and the fourth arm 23. Additionally, the shaft 28 extends along an axis A1, and the second arm 20, the third arm 21, and the fourth arm 23 each have a width along the axis A1. Each of the second cam surface 70, the third cam surface 69, and the fourth cam surface 71 may be flat along at least a portion of the widths of the second arm 20, the third arm 21, and the fourth arm 23. The second bearing 31, the third bearing 32, and the fourth bearing 33 may have complementary flat surfaces which are engageable with the flat surfaces of the second arm 20, the third arm 21, and the fourth arm 23, respectively. Moreover, as shown in FIG. 8, the centering wheel 72 may have a larger diameter than the second bearing 31, the third bearing 32, and the fourth bearing 33. As such, it is to be appreciated that the first cam surface 68 may be relatively smaller than the second cam surface 70, the third cam surface 69, and the fourth cam surface 71.

The first arm 18 and the second arm 20 may be pivotably connected to one another about a pivot point 84. The first arm 18 has a first upper portion 22 disposed between the pivot point 84 and the platform 14. Although not required, the first upper portion 22 may include the cam surface 68. The second arm 20 has a second lower portion 24 disposed between the pivot point 84 and the base 12. The second lower portion 24 may include the second cam surface 70. Moreover, the third arm 21 and the fourth arm 23 may be pivotably connected to one another about another pivot point 84. The third arm 21 has a third upper portion 25 disposed between the pivot point 84 and the platform 14. Although not required, the third upper portion 25 may include the third cam surface 69. The fourth arm 23 may have a fourth lower portion 27 disposed between the pivot point 84 and the base 12. The fourth lower portion 27 may include the fourth cam surface 71.

The shaft 28 extends along an axis A1, and the first arm 18 may be disposed between the second arm 20 and the third arm 21 along the axis A1 such that the first arm 18 is in-board of the second arm 20. Moreover, the third arm 21 may be disposed between the fourth arm 23 and the first arm 18 along the axis A1 such that the third arm 21 is in-board of the fourth arm 23. As such, it is to be appreciated that the second arm 20 may be out-board of the first arm 18, and the fourth arm 23 may be out-board of the third arm 21.

The first arm 18 may be pivotable relative to the platform 14 but fixed longitudinally relative to the platform 14. In a non-limiting example, the first arm 18 is bolted to the platform 14 through a bolted connection defining a pivot axis for the first arm 18 relative to the platform 14. The first arm 18 may include a first rolling element 34 contactable with the base 12 to permit movement of the first arm 18 longitudinally relative to the base 12. More specifically, the first arm 18 may slide relative to the base 12.

The second arm 20 may be pivotable relative to the base 12 but fixed longitudinally relative to the base 12. In a non-limiting example, the second arm 20 is bolted to the base 12 through a bolted connection defining a pivot axis for the second arm 20 relative to the base 12. The second arm 20 may include a second rolling element 35 contactable with the platform 14 to permit movement of the second arm 20 longitudinally relative to the platform 14. More specifically, the second arm 20 may slide relative to the platform 14.

The third arm 21 may be pivotable relative to the platform 14 but fixed longitudinally relative to the platform 14. In a non-limiting example, the third arm 21 is bolted to the platform 14 through a bolted connection defining a pivot axis for the third arm 21 relative to the platform 14. The third arm 21 may include a third rolling element 36 contactable with the base 12 to permit movement of the third arm 21 longitudinally relative to the base 12. More specifically, the third arm 21 may slide relative to the base 12.

The fourth arm 23 may be pivotably fixed relative to the base 12 but fixed longitudinally relative to the base 12. In a non-limiting example, the fourth arm 23 is bolted to the base 12 through a bolted connection defining a pivot axis for the fourth arm 23 relative to the base 12. The fourth arm 23 may include a fourth rolling element 37 contactable with the platform 14 to permit movement of the fourth arm 23 longitudinally relative to the platform 14. More specifically, the fourth arm 23 may slide relative to the platform 14.

The first rolling element 34, the second rolling element 35, the third rolling element 36, and the fourth rolling element 37 may be wheels, other rounded objects, or objects capable of rotation relative to the first arm 18, the second arm 20, the third arm 21, or the fourth arm 23, respectively. The first rolling element 34, the second rolling element 35, the third rolling element 36, and the fourth rolling element 37 may even be bearings, such as ball bearings, roller bearings, needle bearings, or plain bearings, among other possibilities.

The base 12 has a base surface 38 contactable with the first rolling element 34 and the third rolling element 36. The base surface 38 may be free of a track for the rolling elements. More specifically, the base surface 38 may be free of a track for the first rolling element 34 and the third rolling element 36. The centering wheel 72 removes the need for the base 12 to have a track to guide the first rolling element 34 and the third rolling element 36. Instead, alignment of the first rolling element 34 and the third rolling element 36 is ensured because alignment of the first arm 18 and the third arm 21 is ensured. Therefore, the base surface 38 may advantageously be formed without any track whatsoever and may optionally be flat. However, it is also to be appreciated that the base surface 38 may include or define a track as a redundant measure.

The base 12 may include two first opposing stops 42, 42 extending away from the base 12. The two first opposing stops 42, 42 are contactable with the first rolling element 34 to limit movement of the first arm 18. The base 12 may also include two second opposing stops 43, 43 extending away from the base 12. The two second opposing stops 43, 43 are contactable with the third rolling element 36 to limit movement of the third arm 21. Moreover, the base 12 may further include a first top rail 44 extending between the two first opposing stops 42, 42 such that the first rolling element 34 is disposed between the first top rail 44 and the base 12. The first top rail 44 assists in maintaining contact between the first rolling element 34 and the base surface 38. The base 12 may further include a second top rail 45 extending between the two second opposing stops 43, 43 such that the third rolling element 36 is disposed between the second top rail 45 and the base 12. The second top rail 45 assists in maintaining contact between the third rolling element 36 and the base surface 38.

The platform 14 may include a lip 26 extending toward the base 12. Although not required, the platform 14 may have a perimeter, and the lip 26 may extend from the perimeter of the platform 14 toward the base 12. The lip 26 is contactable with the second rolling element 35 and the fourth rolling element 37 to limit movement of the second arm 20 and the fourth arm 23. Moreover, the platform 14 has a platform surface 39 contactable with the second rolling element 35 and the fourth rolling element 37. The platform surface 39 may be free of a track for the rolling elements. More specifically, the platform surface 39 may be free of a track for the second rolling element 35 and the fourth rolling element 37 and may optionally be flat. Still, the platform surface 39 may include or define a track as a redundant measure.

The shaft 28 may be further defined as a first shaft 28, and the lift assembly 10 may further include a second shaft 46 extending transverse to the first arm 18, the second arm 20, the third arm 21, and the fourth arm 23. The second shaft 46 is fixed relative to the first arm 18 and the third arm 21. The second shaft 46 may support the relative position(s) of the first arm 18 and the third arm 21 as the platform 14 moves between the lowered state and the elevated state. The lift assembly 10 may further include a drive system 48 and an output belt 56 configured to be moved by the drive system 48. The output belt 56 wraps partially about the second shaft 46 and extends toward the first shaft 28. The drive system 48 may include the drive mechanism of U.S. Provisional Patent Application No. 63/347,311, which was filed on May 31, 2022, and U.S. patent application Ser. No. 18/204,280 (now U.S. Pat. No. 12,358,767) filed concurrently herewith, both of which are incorporated by reference in their entirety.

The output belt 56 has an end 57, and the lift assembly 10 may further include a bracket 62 coupled to the end 57 of the output belt 56. The bracket 62 may be fixed to the first shaft 28, as shown in FIG. 4.

Alternatively shown in FIGS. 5-6 and 8, the bracket 62 may be fixed to the platform 14 with the output belt 56 further extending to the first shaft 28, wrapping partially about a roller 29 rotatably disposed on the first shaft 28, and extending toward the platform 14. In this embodiment a third shaft 86 is included that is mounted to the platform 14.

Figure 3:
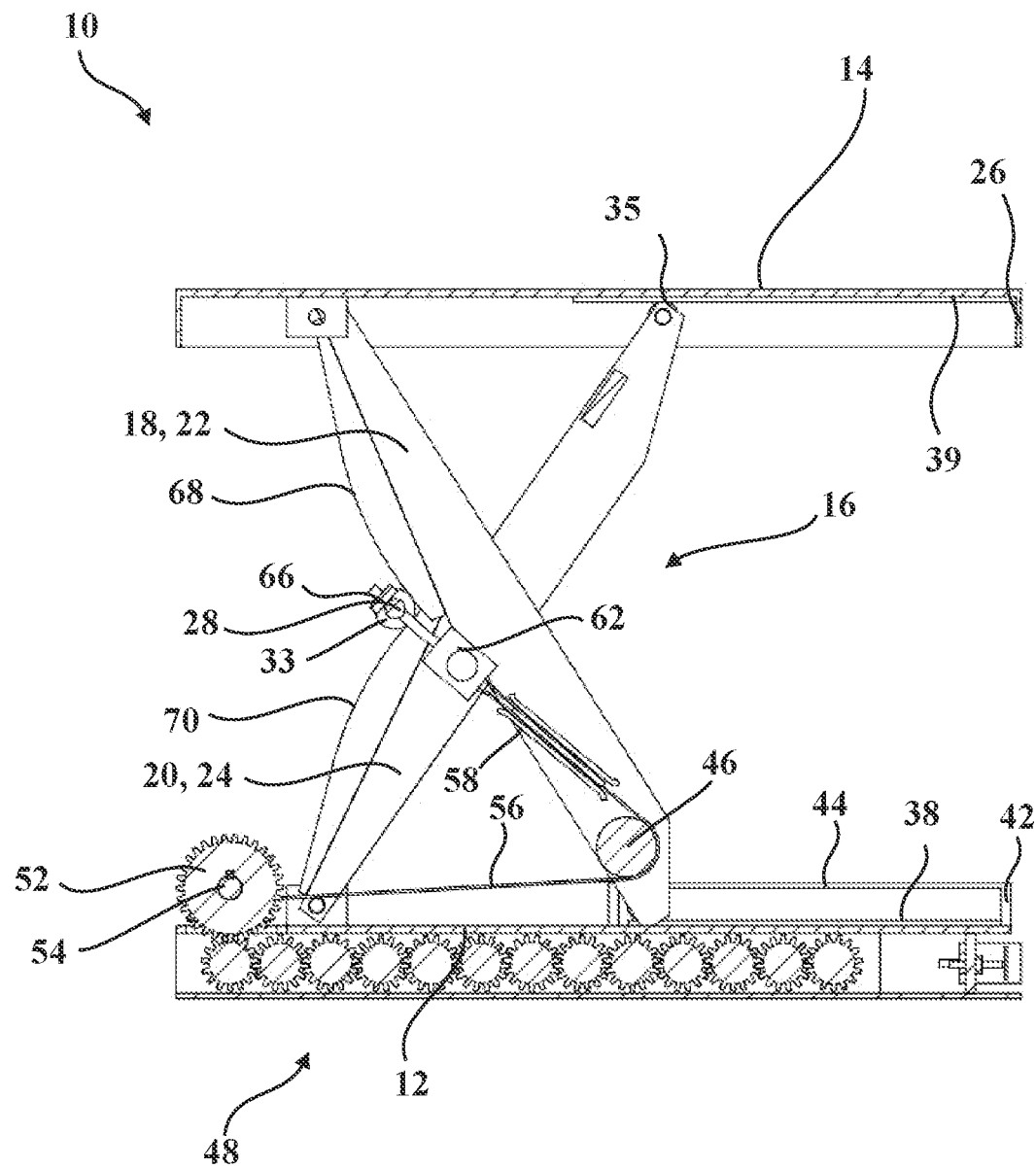
FIG. 3 is a side view of the lift assembly partially in cross-section.

The first arm 18, the second arm 20, the third arm 21, and the fourth arm 23 may be moved through use of the drive system 48 including, but not limited to, a low-profile drive system 48 as shown in FIG. 3. The drive system 48 may include an electric motor 50 (or a plurality of electric motors 50 arranged in series) which output rotational torque to an output member 52. The output member 52 may be rotationally fixed to an output shaft 54 such that rotation of the output member 52 by the electric motors 50 rotates the output shaft 54. The drive mechanism 48 may further include the output belt 56, and the output belt 56 may be fixed to the output shaft 54. Upon rotation of the output shaft 54, the output belt 56 may be wound about the output shaft 54. The output belt 56 may include a clamp 58 to create a loop 60 at the end 57 of the output belt 56. It is also to be appreciated that the drive mechanism 48 may include a second output belt 56 having the characteristics of the output belt 56 as described herein, or may include a third output belt or more output belts. Although not required, the output belt(s) 56 may extend from the output shaft 54 substantially along the base 12 to the second shaft 46. The output belt(s)

56 may then wrap partially about the second shaft 46 and extend toward the first shaft 28.

Although not required, the bracket 62 may have a U-shaped configuration and may include a bracket pin 64 extending through the loop 60 of the output belt 56 to fix the bracket 62 to the output belt 56. The bracket 62 may be fixed to the first shaft 28, as shown in FIG. 4. In a non-limiting example, the bracket(s) 62 may be bolted to the first shaft 28 through a bolted connection to fix the bracket 62 to the first shaft 28. Alternatively, as shown in FIG. 5, the bracket(s) 62 may be spaced from the first shaft 28 due to the output belt 56 wrapping around the roller 29. The lift assembly 10 may also include a backing plate 66 coupled to the first shaft 28 (as in FIG. 4) or coupled to the third shaft 86 (as in FIG. 5) to provide a flat surface for the bracket 62 to be bolted to. It is to be appreciated that the bracket 62 may be welded, brazed, soldered, or otherwise physically joined with the shaft 28, 86, or may be formed integrally with the shaft 28, 86 such as but not limited to by casting.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A lift assembly comprising;
   a base;
   a platform coupled to said base, said platform moveable between a lowered state where said platform is proximal to said base and an elevated state where said platform is distal to said base;
   a first pair of scissor arms including a first arm coupled to said platform and said base and a second arm coupled to said platform and said base, with said first arm and said second arm pivotably connected to one another;
   a second pair of scissor arms including a third arm coupled to said platform and said base and a fourth arm coupled to said platform and said base, with said third arm and said fourth arm pivotably connected to one another; and
   a carriage coupled to said first pair of scissor arms and to said second pair of scissor arms, said carriage including,
      a shaft extending transverse to said first arm, said second arm, said third arm, and said fourth arm, and
      a centering wheel rotatably coupled to said shaft;
   wherein said first arm includes a cam surface engageable with said centering wheel to guide travel of said platform between said lowered state and said elevated state.

2. The lift assembly of claim 1, wherein said centering wheel has a concave surface engageable with said cam surface.

3. The lift assembly of claim 2, wherein said cam surface has a convex surface shaped to correspond to said concave surface of said centering wheel.

4. The lift assembly of claim 1 further comprising a bearing disposed about said shaft, wherein said centering wheel is disposed about said bearing.

5. The lift assembly of claim 4, wherein said bearing is further defined as a first bearing, and further comprising another bearing disposed about said shaft.

6. The lift assembly of claim 5, wherein said cam surface is further defined as a first cam surface, and wherein said third arm includes a third cam surface with said another bearing engaging said third cam surface in unison with said centering wheel engaging said first cam surface.

7. The lift assembly of claim 4, wherein said bearing is further defined as a first bearing, and further comprising a second bearing disposed about said shaft, a third bearing disposed about said shaft, and a fourth bearing disposed about said shaft.

8. The lift assembly of claim 7, wherein said cam surface is further defined as a first cam surface, wherein said second arm includes a second cam surface engageable with said second bearing, wherein said third arm includes a third cam surface engageable with said third bearing, and wherein said fourth arm includes a fourth cam surface engageable with said fourth bearing.

9. The lift assembly of claim 8, wherein said first arm, said second arm, said third arm, and said fourth arm each have a length, and wherein said first cam surface, said second cam surface, said third cam surface, and said fourth cam surface are arcuate along at least a portion of said lengths of said first arm, said second arm, said third arm, and said fourth arm.

10. The lift assembly of claim 1, wherein said first arm and said second arm are pivotably connected to one another about a pivot point, wherein said first arm has a first upper portion disposed between said pivot point and said platform, and wherein said first upper portion includes said cam surface.

11. The lift assembly of claim 1, wherein said shaft extends along an axis, and wherein said first arm is disposed between said second arm and said third arm along said axis such that said first arm is in-board of said second arm.

12. The lift assembly of claim 1, wherein said first arm is pivotable relative to said platform but fixed longitudinally relative to said platform, and includes a first rolling element contactable with said base to permit movement of said first arm longitudinally relative to said base,
   wherein said second arm is pivotable relative to said base but fixed longitudinally relative to said base, and includes a second rolling element contactable with said platform to permit movement of said second arm longitudinally relative to said platform,
   wherein said third arm is pivotable relative to said platform but fixed longitudinally relative to said platform, and includes a third rolling element contactable with said base to permit movement of said third arm longitudinally relative to said base, and
   wherein said fourth arm is pivotably fixed relative to said base but fixed longitudinally relative to said base, and includes a fourth rolling element contactable with said platform to permit movement of said fourth arm longitudinally relative to said platform.

13. The lift assembly of claim 12, wherein said base has a base surface contactable with said first rolling element and said third rolling element, and wherein said base surface is free of a track for said rolling elements.

14. The lift assembly of claim 12, wherein said base includes two first opposing stops extending away from said base, with said two first opposing stops contactable with said first rolling element to limit movement of said first arm, and wherein said base includes two second opposing stops extending away from said base, with said two second opposing stops contactable with said third rolling element to limit movement of said third arm.

15. The lift assembly of claim 12, wherein said platform includes a lip extending toward said base, and wherein said lip is contactable with said second rolling element and said fourth rolling element to limit movement of said second arm and said fourth arm.

16. The lift assembly of claim 12, wherein said platform has a platform surface contactable with said second rolling element and said fourth rolling element, and wherein said platform surface free of a track for said rolling elements.

17. The lift assembly of claim 1, wherein said shaft is further defined as a first shaft, and further comprising a second shaft extending transverse to said first arm, said second arm, said third arm, and said fourth arm, with said second shaft fixed relative to said first arm and said third arm, and further comprising a drive system and an output belt configured to be moved by said drive system, with said output belt wrapping partially about said second shaft, and extending toward said first shaft.

18. The lift assembly of claim 17, wherein said output belt has an end, and wherein said lift assembly further comprises a bracket coupled to said end of said output belt.

19. The lift assembly of claim 18, wherein said bracket is fixed to said first shaft.

20. The lift assembly of claim 18, wherein said bracket is fixed to said platform with said output belt further extending to said first shaft, wrapping partially about said first shaft, and extending toward said platform.

\* \* \* \* \*